Sept. 12, 1967                D. E. CATE                3,341,757
BRIDGE CIRCUIT FOR DETERMINING THE INVERSE OF RESISTANCE
Filed July 11, 1966                                                2 Sheets-Sheet 1
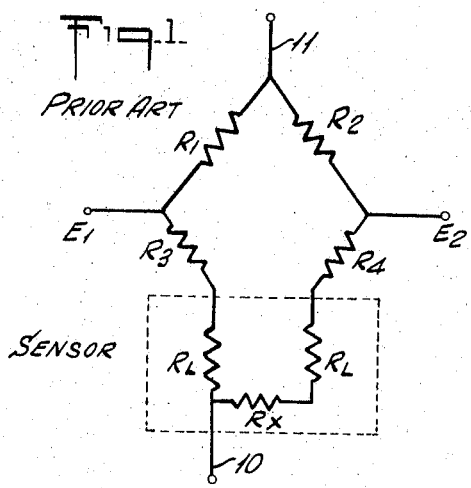
INVENTOR
DEXTER E. CATE
BY *Nolte & Nolte*
ATTORNEYS Sept. 12, 1967     D. E. CATE     3,341,757
BRIDGE CIRCUIT FOR DETERMINING THE INVERSE OF RESISTANCE
Filed July 11, 1966     2 Sheets-Sheet 2
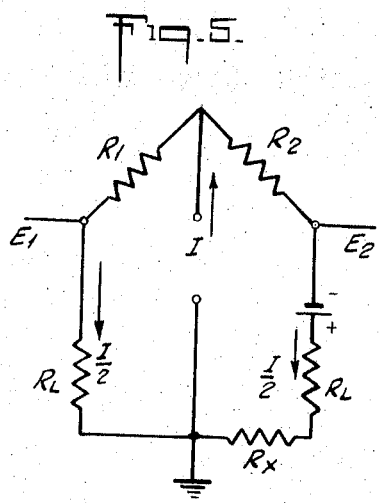
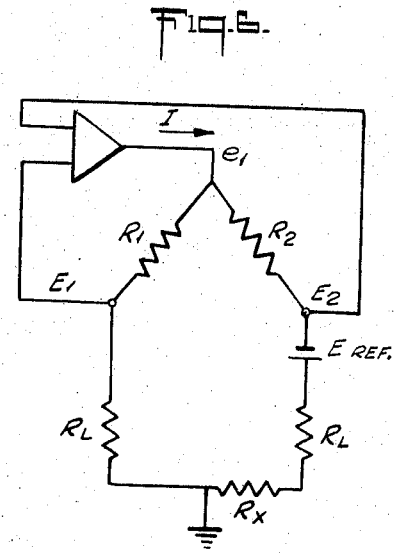
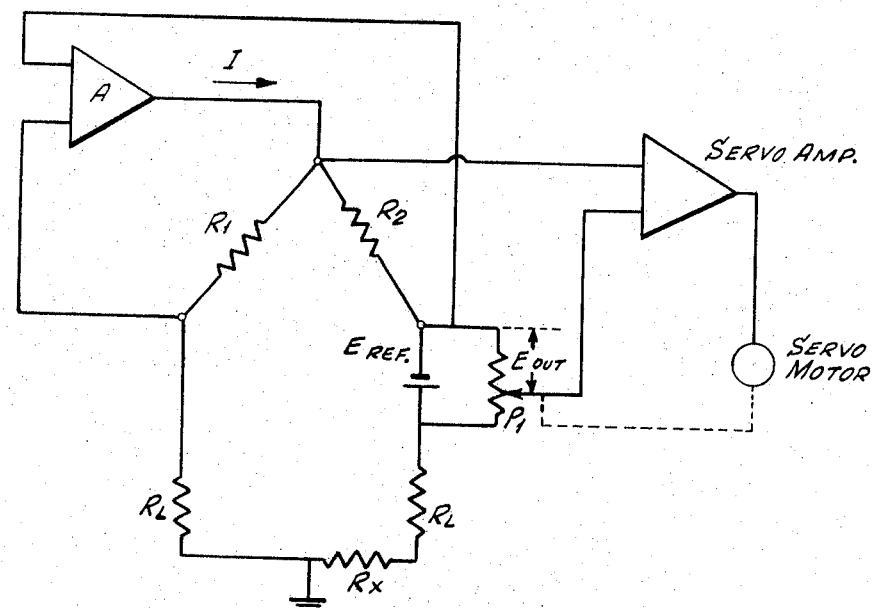
INVENTOR
DEXTER E. CATE
BY
Nolte & Nolte
ATTORNEYS

United States Patent Office 3,341,757
Patented Sept. 12, 1967

3,341,757
BRIDGE CIRCUIT FOR DETERMINING THE INVERSE OF RESISTANCE
Dexter E. Cate, North Dartmouth, Mass., assignor to Buzzards Corporation, Marion, Mass., a corporation of Massachusetts
Filed July 11, 1966, Ser. No. 564,075
9 Claims. (Cl. 318—18)

ABSTRACT OF THE DISCLOSURE

A bridge circuit for use in servo systems, provides a current flow which is a linear function of the inverse of a resistance connected in one of the bridge arms. A source of reference voltage is connected in one of the bridge arms and means are provided to maintain the bridge in a null condition and to control the current in the bridge circuit to achieve the desired inverse relationship between the current and resistance.

---

The present invention relates to a bridge circuit whose output is inverse to the resistance change of an electrical component such, for example, as a thermistor, the resistance of which is a non-linear function of temperature.

The bridge circuit of the invention may include servo means to provide position information which is a function of the ratio between a reference voltage and a measured current, which position information may be calibrated to provide an indication of a variable quantity to be measured; i.e., the varying resistance of a thermistor when subjected to changing temperature conditions.

In accordance with the invention, I provide an electrical bridge circuit comprising a plurality of bridge arms connected to each other to form a null, bridge, a resistor having a varying resistance value and being connected in one of said bridge arms, and feed-back means for maintaining a null condition in said bridge, characterized in that for providing a current flow which is a linear function of the inverse of said varying resistance of said resistor, there is provided a source of reference voltage which is connected in said one of said bridge arms.

Objects and advantages of the invention will be apparent from the following description taken in conjunction with the accompanying drawings, in which:

FIG. 1 is a circuit diagram of a bridge circuit utilized in a servo system;

FIG. 2 is a modification of the bridge circuit of FIG. 1;

FIG. 3 is another modification of the bridge circuit of FIG. 1;

FIG. 4 is still another modification of the bridge circuit of FIG. 1;

FIG. 5 is a circuit diagram of a bridge circuit illustrating the basic principle of the present invention;

FIG. 6 is a modification of the bridge circuit of FIG. 5 including a null maintaining branch; and FIG. 7 is a circuit diagram of an embodiment of the bridge circuit of the present invention.

Bridge circuits commonly used in servo feedback instruments where the resistance is the measured variable may place great demands on the feedback element. If resistance of the lead wires is significant with respect to the measured resistance, a third lead must be used, and equal currents maintained in the two halves of the bridge (see FIG. 1). As is well known in the art, to maintain a bridge balanced, or in null position, it is necessary to utilize a feed-back element. The feed-back element may take the form shown in FIGS. 2 to 4 which will hereinafter be described.

In FIG. 1, resistors $R_1$, $R_2$, $R_3$, and $R_4$, each form one arm of the bridge. In series with resistors $R_3$ and $R_4$, there is connected, for example, a sensor which may comprise a thermistor whose equivalent resistance is in $R_x$. The lead resistance of the thermistor is $R_L$ and if the resistance of the thermistor lead is significant with respect to the resistance of the thermistor to be measured, a third resistance $R_L$ is used to maintain equal currents in the two halves of the bridge when the latter is balanced. The current flowing between terminals 10 and 11 in FIG. 1 should desirably be related inversely to the resistance change of, for example, the thermistor. Also, by means of the feed-back element, the output terminals $E_1$ and $E_2$ should be maintained zero for all changes in resistance of the thermistor.

The bridge circuit of FIGS. 2, 3 and 4 are similar to that of FIG. 1 excepting that in FIG. 2, resistor $R_4$ is replaced by a variable resistance $P_4$; in FIG. 3 resistor $R_3$ is replaced by resistance $P_3$ and in FIG. 4 resistor $R_3$ is replaced by variable resistors $P_1$ and $P_2$.

In FIG. 2, feed-back is accomplished by (1) a variable resistance $P_4$ in the measurement arm whose variation in resistance is complementary to the change in resistance of the thermistor. In FIG. 3, the variable resistance $P_3$ is placed in the arm of the bridge opposite to that illustrated in FIG. 2, the variation of resistor $P_3$ being directly related to the variation in resistance of the thermistor. In FIG. 4, two ganged variable resistors $P_1$ and $P_2$ are utilized, $P_1$ maintaining equal current in both halves of the bridge, variable resistor $P_2$ serving to balance the bridge to provide across terminal $E_1$ and $E_2$ a zero output. If the measured resistance is non-linear function of the implied variable (as resistance in a thermistor is a non-linear function of temperature) the feed-back must also be a non-linear function to give a linear output. If the non-linear input varies over a wide range, the gain of the servo may change by an intolerable ratio over the space of the instrument calibration.

Where a thermistor is used to measure temperature over a span of 50° F. or more, the measurement schemes described above result in the following deficiencies.

A variable resistance obtained from a rheostat as shown in FIGS. 2 and 3 introduces contact noise directly as feedback. Change in slope of the resistance vs. temperature curve is introduced directly as gain change. A non-linear rheostat, or a shunted rheostat is required.

Ganged potentiometers, as shown in FIG. 4, may create contact noise outside the bridge in the supply circuit and in the amplifier input circuit. Furthermore, the use of a pair of ganged non-linear pots is undesirable from an economic standpoint.

The foregoing problems are avoided, in accordance with the invention, by introducing a fixed voltage into one of the arms of a conventional bridge of the type shown, for example, in FIG. 1. By introducing such fixed voltage it is possible to determine the resistance of the thermistor by determining the current flowing in the bridge without resorting to prior art feed-back elements. The reason for this will be evident from the following analysis.

The state of the art in solid state operational amplifiers now makes the following measurement scheme desirable from an economic standpoint, where the measured variable is, or can be made nearly like the function $$X = K \cdot \frac{1}{R}$$

where K is a constant, and R is a value of resistance. In the case of a thermistor, a padding resistance, $R_s$ can be added in series with the thermistor to produce a non-linearity (in the form of an S curve) of a few percent of span.

I have determined that by introducing a fixed voltage in one arm of a conventional bridge, it is possible to obtain a measuring circuit which reads the inverse of resistance. This may be accomplished by varying the current through the bridge until a null is reached, at which point the two halves of the bridge have equal current. Such variation of current may be obtained by utilizing the arrangement of FIG. 6, hereinafter described. First, however, with reference to FIG. 5, like parts have been identified with the same reference characters utilized, for example, in FIG. 1.

Assume $E_1 - E_2 = 0$, i.e., the bridge is at null. If $R_1 = R_2$ then bridge current I must flow equally into $R_1$ and $R_2$ for $E_1 - E_2$ to equal 0. We can write equations:

$$E_1 = E_2$$

and $$\frac{1}{2}R_L = \frac{1}{2}R_L + \frac{1}{2}R_x - E_{ref}$$

$$\frac{1}{2}R_x = E_{ref}$$

and $$I = \frac{2E_{ref}}{R_x} = \frac{K_1}{R_x}$$

Current is therefore a linear function of the inverse of $R_x$. By utilizing a fixed reference voltage a balanced bridge with lead-wire compensation has been achieved, with variable current as the rebalance quantity. To use this bridge we must:

(1) Maintain null.
(2) Determine the current.

To maintain the null, the quantity $E_1 - E_2$ may be fed to an operational amplifier having differential input (FIG. 6). The output is then used as bridge supply current. Input polarity is connected to give negative feedback. Provided the gain of the amplifier is sufficiently high, $E_1 - E_2$ is negligibly small and bridge balance is maintained.

$$I = \frac{2E_{ref}}{R_x}$$

$$e_1 = \frac{2E_{ref}}{R_x} \times \frac{R_1 + R_L}{2} = \frac{R_1 + R_L}{R_x}$$

If A = Gain $$A(E_1 - E_2) = E_{ref}\frac{R_1 + R_L}{R_x}$$

where $E_{ref}$ is the reference voltage, $R_x$ the resistance of the thermistor, $R_1$ the resistance value of one of the arms of the bridge, and $R_L$ is the resistance of the thermistor lead.

To measure the output current I can, of course, use a conventional potentiometric servo system and read the voltage drop in a fixed resistance inserted in the amplifier output circuit. Closer inspection reveals, however, that it is preferable to obtain the ratio of output current to the reference, $E_{ref}$ as follows.

Equation 1 was:

$$\frac{1}{2}R_x = E_{ref}$$

$$\frac{1}{R_x} = \frac{I}{2E_{ref}} \quad (2)$$

If the drop in one arm of the bridge is compared to $E_{ref}$, the ratio of the two can be determined $$\frac{\frac{1}{2}R_2}{E_{ref}} = r$$

where $r$ is a ratio and $R_2$ is the resistance of one arm of the bridge.

$$\frac{1}{2}R_2 = rE_{ref} \quad (3)$$

Substituting in 2

$$\frac{1}{R_x} = \frac{r}{R_2}$$

We now see that $1/R_x$, which is of interest as a nearly linear function of T, is directly proportional to $r$, and is also independent of $E_{ref}$.

Equation 3 may be reduced to circuitry very simply as shown in FIG. 7, where the potentiometer $P_1$ has a ratio $r$ for $E_{out}/E_{ref}$.

$P_1$ is driven by the servo amplifier until it sees null, at which the mechanical output is an indication of Pot ratio $r$.

We now have, for servo null:

$$\frac{1}{2}R_2 = rE_{ref}$$

which is the same as Equation 3.

SUMMARY

The circuit of FIG. 7 has the following characteristics:

(1) Mechanical output, a direct function of $r$, is a measure of $1/R_x$.
(2) Servo gain is as linear as the function $r$.
(3) $E_{ref}$ is non-critical, affecting only the gain of the system.
(4) Voltage across the unknown, $R_x$, is a constant, which may be of interest where insulation leakage in the lead wires is sensitive to voltage magnitude, or polarity.

The foregoing disclosure relates only to preferred embodiments of the invention which is intended to include all changes and modifications of the examples described within the scope of the invention as set forth in the appended claims.

What is claimed is:

1. In a servo system, a bridge circuit for providing a current flow which is a linear function of the inverse of a resistance, said bridge circuit comprising a plurality of bridge arms, connected to each other to form a null bridge, a resistor connected in one of said bridge arms and having a resistance, a source of reference voltage connected in series in one of said bridge arms, means connected to said bridge circuit for maintaining said bridge in a null condition, said null maintaining means comprising means connected to said bridge circuit for controlling the current in said bridge circuit, said bridge circuit thereby having a current flow therein which is substantially a linear function of the inverse of the resistance of said resistance.

2. The combination as defined in claim 1, wherein said null maintaining means includes an operational signal flow.

3. The combination as defined in claim 1, further comprising a potentiometer connected in shunt across said source of reference voltage, and second null maintaining means connected to said bridge for positioning said potentiometer.

4. The combination as defined in claim 3, wherein said second null indicating means comprises servo amplifier means having a pair of input terminals, one of said pair of input terminals being connected to a point on said bridge and the other of said pair of input terminals being connected to said potentiometer, said second null maintaining means comprising a servo motor connected to the output of said servo amplifier means.

5. The combination as defined in claim 4, also comprising mechanical means for coupling said servo motor to said potentiometer.

6. The combination as defined in claim 1, wherein corresponding ones of the arms of said bridge circuit are connected to each other at connecting points, said current control means comprising an operational amplifier having a differential input connected to two connecting points of said bridge circuit and an output connected to a third connecting point of said bridge circuit, said operational amplifier having a substantially high gain and providing a negative feedback between connecting points of said bridge circuit, and further comprising means for determining the relationship between said reference voltage and the current in said bridge circuit comprising potentiometer means connected across said source of reference voltage and including a movable slide member for varying the resistance thereof and thereby providing a ratio of potentiometer voltage to said reference voltage, a servo amplifier having an input connected to the third connecting point of said bridge circuit, an input connected to the slide member of said potentiometer means and an output, and a servo motor having an input electrically connected to the output of said servo amplifier and being mechanically coupled to the slide member of said potentiometer means for moving said slide member as a direct function of said ratio and indicating the inverse of said resistance.

7. A bridge circuit for providing a current flow which is a linear function of the inverse of a resistance, said bridge circuit comprising a plurality of bridge arms connected to each other to form a null bridge, a resistor connected in one of said bridge arms and having a resistance, a source of reference voltage connected in series in said one of said bridge arms, null maintaining means connected to said bridge circuit for maintaining said bridge in null condition, said null maintaining means comprising current control means connected to said bridge circuit for controlling the current in said bridge circuit said bridge circuit having a current flow therein which is a linear function of the inverse of the resistance of said resistor.

8. A bridge circuit as defined in claim 7, wherein said nullifying means includes an operational amplifier having a differential input, said amplifier having a pair of inputs connected to two points on said bridge, said amplifier having its output connected to a third point on said bridge, said third point being between said two points.

9. A bridge circuit as defined in claim 7, further including a potentiometer connected in shunt across said source of reference voltage.

References Cited

UNITED STATES PATENTS 3,111,620  11/1963  Baker _____ 323—75
3,247,703  4/1966   Burk _____ 323—75

BENJAMIN DOBECK, *Primary Examiner.*